Patented Feb. 9, 1943

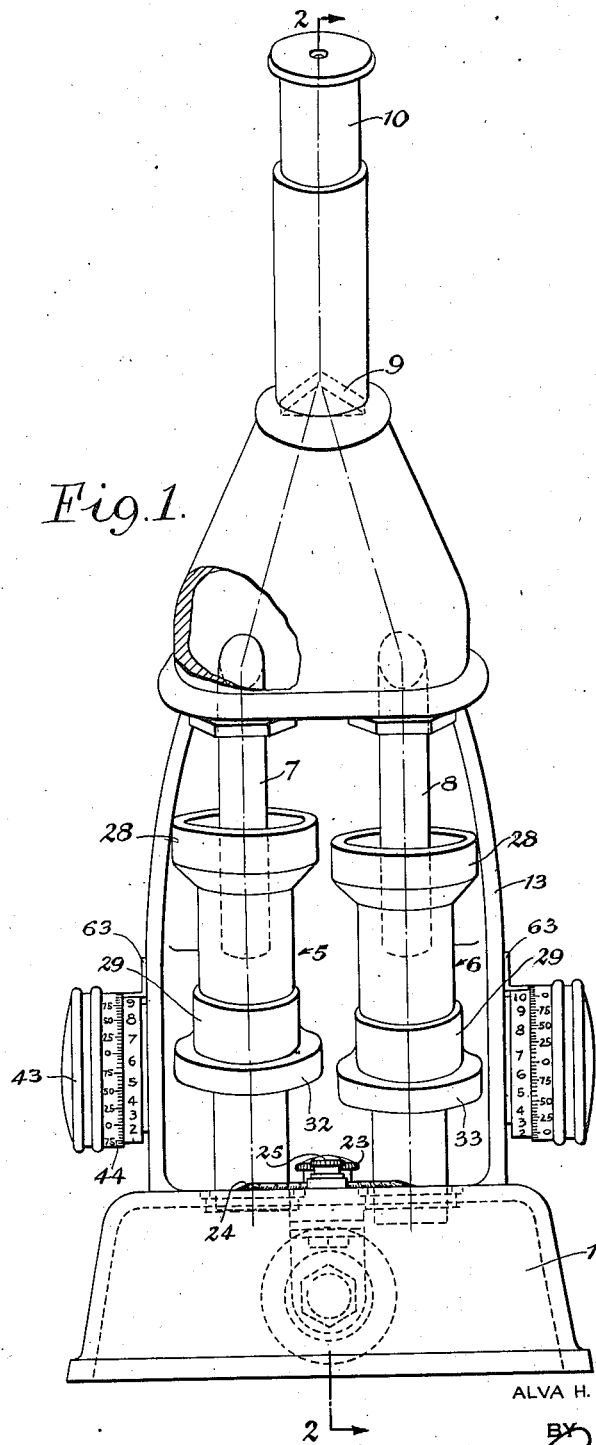

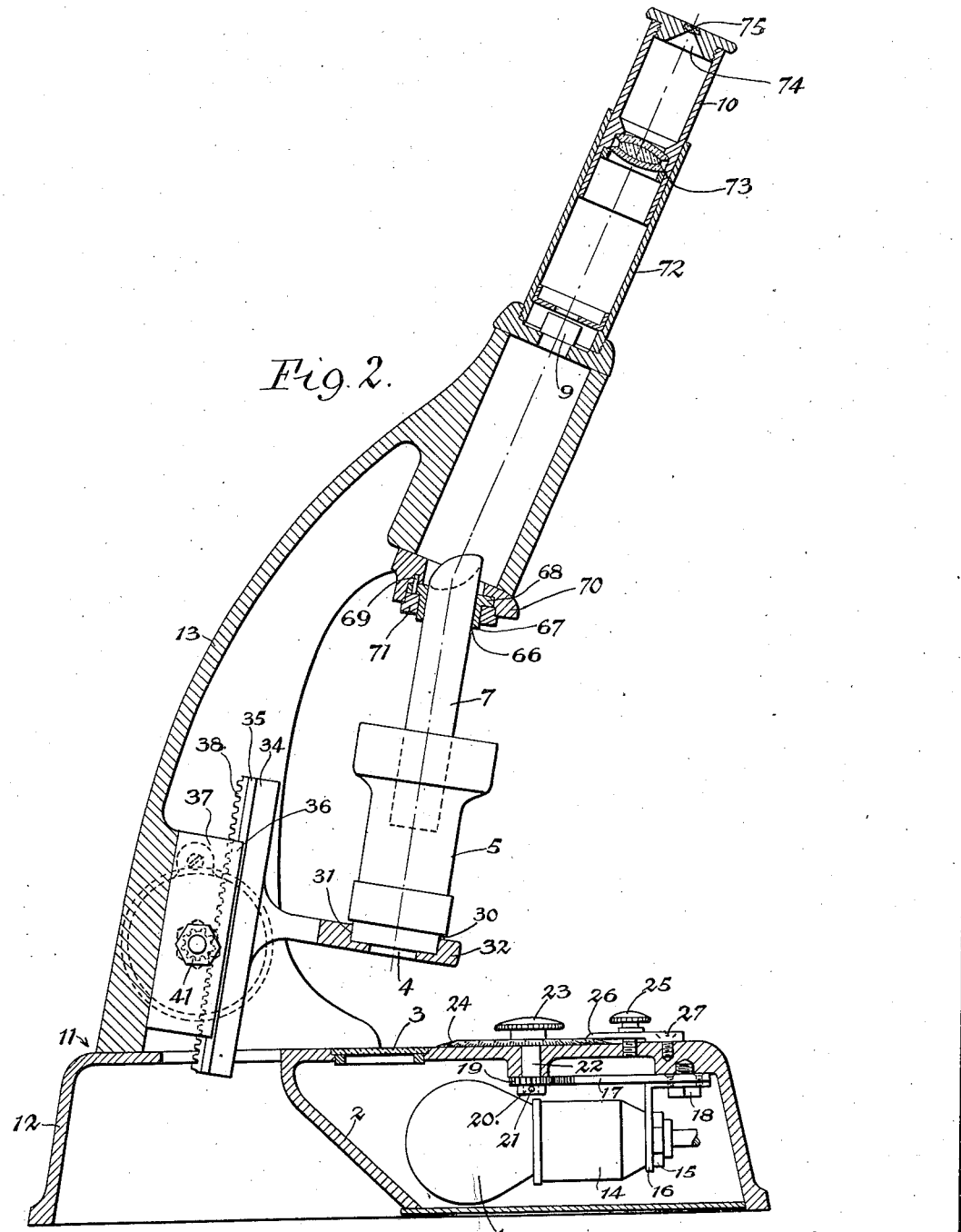

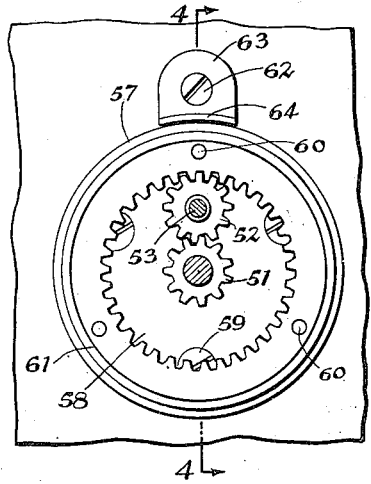
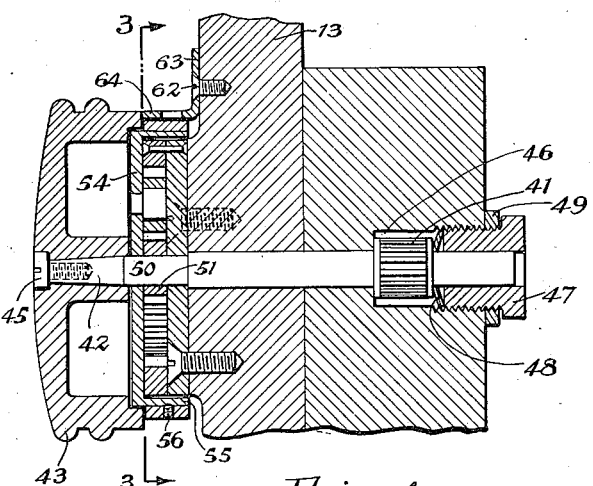
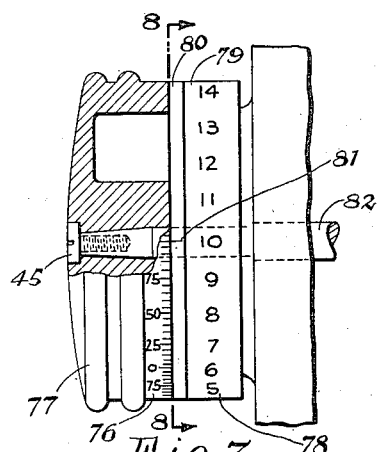
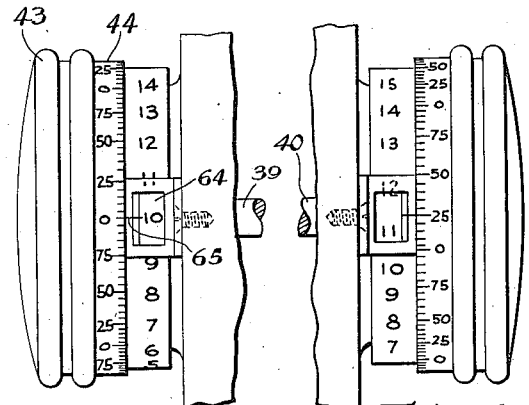
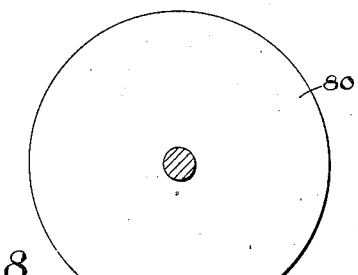

2,310,608

UNITED STATES PATENT OFFICE 2,310,608

COLORIMETER

Alva H. Bennett, Kenmore, and Roger S. Estey, Buffalo, N. Y., assignors to Spencer Lens Company, Buffalo, N. Y., a corporation of New York Original application February 23, 1939, Serial No. 257,798. Divided and this application February 29, 1940, Serial No. 321,436

3 Claims. (Cl. 88—14)

This invention relates to a colorimeter and more particularly to a colorimeter for measuring the amount of light which passes through a given unknown solution and thereby enabling certain quantitative characteristics of said solution to be ascertained.

This application is a division of our application Serial Number 257,798, filed February 23, 1939 (Patent No. 2,281,545, issued May 5, 1942).

The principal objects of the invention are:

(a) To provide a colorimeter having index scales which are easy to read and yet are very accurate.

(b) To provide means associated with a colorimeter scale for conveniently adjusting the fiducial mark of said scale.

Numerous other objects of the invention and practical solutions thereof are described in the following specification and illustrated in the attached drawings, wherein:

Fig. 1 is a front elevation of one form of our improved colorimeter.

Fig. 2 is a vertical longitudinal section thereof, taken on line 2—2 of Fig. 1.

Fig. 3 is an enlarged fragmentary vertical section of the scale mechanism, taken on line 3—3 of Fig. 4, showing the means of indexing the position of the left hand cup of the colorimeter.

Fig. 4 is an enlarged fragmentary vertical section thereof, taken on line 4—4 of Fig. 3.

Fig. 5 is an enlarged fragmentary top plan of said left hand colorimeter cup indexing device.

Fig. 6 is a similar enlarged fragmentary top plan of the right hand colorimeter cup indexing device.

Fig. 7 is an enlarged fragmentary top plan of a modified form of colorimeter cup indexing device.

Fig. 8 is an enlarged fragmentary vertical transverse section thereof, taken on line 8—8 of Fig. 7.

Similar characters of reference indicate like parts throughout the several figures of the drawings.

In its general organization, the improved form of colorimeter comprises a lamp bulb 1 which throws light against a reflector 2 up through a pair of transparent plates 3 and through a pair of circular windows 4 arranged at the bottom of a pair of colorimeter cups 5 and 6. The one of these cups, for instance, 5, is adapted to hold the unknown solution while the other cup is adapted to hold the standard solution or other standard transparent material. Light from these two colorimeter cups passes upwardly through a pair of plungers 7 and 8 and is deflected by their beveled upper ends into a bi-prism 9 which produces a divided field which is viewed by the operator through an eyepiece 10. As is well known in the art, the colorimeter cups 5 and 6 are adapted to be so positioned vertically relatively to each other that an equal amount of light passes up into each of the colorimeter plungers 7 and 8 and thereby enables the unknown solution to be quantitatively determined as to certain of its characteristics.

The main frame 11 of the colorimeter consists of a base 12 and a standard 13 secured to and extending upwardly and obliquely forwardly from said base. Arranged in the front part of the colorimeter, as best shown in Fig. 2, is aforesaid lamp 1 which is detachably arranged in the usual manner in a lamp socket 14 that is secured at its extreme rear end by a clamp nut 15 to a depending bracket 16. The latter, together with a thin, sheet metal gear segment 17 to which it is suitably secured by means of rivets or otherwise, is pivoted to the colorimeter base 12 upon a pivot screw 18. This pivoting arrangement permits the lamp 1 to be swung around the pivot 18 in the one or other direction in a horizontal plane until the illumination up through the two transparent members 3 is equal. The gear teeth at the outer part of the gear segment 17 mesh with an actuating pinion 19 whose hub 20 is secured by a pin 21 or otherwise to the lower end of an actuating spindle 22 having an actuating knob 23 suitably secured to its upper end. This enables the operator, by turning said actuating knob 23 in the one or other direction, to swing the lamp 1 to its properly adjusted position.

Where extreme accuracy is desired, it is preferably to properly position this lamp a plurality of times and to take a reading of its position each time and to then compute the average of these readings. To enable this operation to be conveniently effected the actuating knob 23 is suitably secured to a disc shaped, annularly beveled locating scale 24 which is suitably inscribed on its beveled periphery so that the position of the lamp 1 for each setting may be ascertained with reference to a fiducial mark, which is suitably inscribed on the upper face of the base 12 of the bulb 1 in its properly adjusted position, a clamping knob 25 is screwed down. This clamp screw pushes down the overhanging end of a clamping arm 26 upon the upper face of the annular scale 24 and clamps the latter against the upper face of the colorimeter base 12. The rear end of said clamping arm 26 is suitably secured to the colorimeter base 12 by means of a counter-sunk machine screw 27 or otherwise.

Excessive movement of the gear segment 17 is prevented by a pair of stop lugs which project integrally and downwardly from the lower face of the top wall of the colorimeter base 12.

Each of the colorimeter cups 5 and 6 comprises a main cup body 28, a securing sleeve 29, a transparent window 4 and a resilient washer 30.

Each colorimeter cup is adapted to be received within an annular locating hollow 31 formed in the upper front end of its companion elevator platform 32 or 33 as the case may be. The rear end of each of said elevator platforms is integrally or otherwise secured to an upwardly and obliquely forwardly extending slide bar 34 which is provided adjacent its rear edge with a dovetailed slide 35. The latter slideably engages with a dovetailed slideway 36 which is formed on a block 37; that is suitably secured to the standard 13 of the colorimeter. Secured to the rear face of each slide bar 34 is a rack 38. Journaled in the standard 13 are a pair of horizontal, transverse, coaxial operating shafts 39 and 40, and to each of said operating shafts is secured a pinion 41 which engages with a companion rack 38.

Confining our attention for the moment to the left hand operating shaft 39, it will be noted that it is provided at its outer end with a tapered portion 42 upon which is mounted an operating knob 43, upon the inner portion of the periphery of which is engraved or otherwise marked a "fine" scale 44. This tapered connection between the operating shaft 39 and its operating knob 43, in combination with the machine screw 45 which is adapted to firmly lock them together, enables said operating knob 43 to be indexed rotatably to its correct position relatively to said operating shaft. Outward movement of the operating shaft 39 is prevented by the engagement of the outer face of the pinion 41 with a vertical, countersunk shoulder 46 which is formed in its companion slide block 37 concentrically with the axis of said operating shaft 39. Inward displacement of said operating shaft 39 is prevented by a hollow thrust sleeve 47 which encircles the inner end of said operating shaft and is threaded into its companion slide block 37 and bears outwardly against a resilient thrust washer 48, which, in turn, resiliently bears against the inner end of the pinion 41. This construction enables the proper amount of friction against rotation of the operating knob 43 to be adjustably obtained and also permits of a considerable amount of wear of the moving parts without appreciably affecting the amount of friction. The thrust sleeve 47 is suitably locked in place by a lock nut 49.

Secured by the Woodruff key 50 or otherwise near the outer end of said operating shaft 39 is a driving pinion 51 which meshes with a planetary pinion 52. The latter is journaled on a stud 53 having a reduced outer end which is press fitted into or is otherwise secured to a planetary drum 54. The latter is journaled on the operating shaft 39 exteriorly of the driving pinion 51 and is provided at its outer part with an annular flange 55. Secured by an adjusting screw 56 or otherwise to the outer annular face of this annular flange 55 is a ring shaped "coarse" scale 57. The latter has inscribed on its outer annular face a semi-circular row of numerals extending from 0 to 14. It will be noted that the outer or "fine" scale 44 of the operating knob 43 is constituted of a plurality of scale sections, each of which extends from 0 through 25, 50 and 75 to 100. The 100 point on one section coincides with the 0 point on the next and for convenience is marked 0. The number of these scale sections is a whole number and said scale sections are inscribed with unbroken continuity upon the entire peripheral face of said "fine" scale 44.

Arranged against the outer face of the colorimeter standard 13 concentrically with the operating shaft 39, is a disc 58 which is secured to said colorimeter standard by a plurality of flat headed, countersunk machine screws 59 or otherwise. Secured concentrically to said disc 58 by means of the rivets 60 or otherwise is an internal gear 61 which meshes with aforesaid planetary pinion 52. Thus, as the operating knob 43 with its fine scale 44 is rotated through a given angle, the coarse scale 57 is caused to rotate through a relatively smaller angle.

Secured by a machine screw 62 or otherwise to the colorimeter standard 13 is a fiducial bracket 63 having a rectangular view opening 64. Etched or otherwise marked upon the upper, central, outer part of said fiducial bracket is a fiducial mark 65, the inner end of which registers with the coarse scale 57 while its outer end registers with the fine scale 44. For instance, in Fig. 5, the reading is 10.0 while in Fig. 6 the reading is 11.25.

The arrangement of the various parts of the colorimeter is such that, for all ordinary solutions, the position of the left hand elevator platform, 32, is never changed from that indicated in the drawings. In this position the distance from the bottom of the left hand plunger 7 to the top face of the left hand colorimeter cup window 4 is such that the coarse adjustment scale 57 (see Fig. 5) reads 10 and the fine adjustment scale 44 reads 0. When these two left hand scales are in this position and the light beams are balanced by adjusting the position of the right hand cup, the reading of the right hand scales, shown in Fig. 6, when multiplied by 10 indicates the concentration of coloring matter in the left solution expressed as a percentage of the similar coloring matter in the right solution. In the particular setting shown in Figs. 5 and 6 the reading of the right hand scales is 11.25 and hence the unknown solution is 112.5% more concentrated than the known solution. This enables the concentration of all ordinary solutions to be very accurately determined without any mathematical calculation.

This arrangement of the colorimeter does not, however, prevent unusual solutions from being analyzed. In such a case both of the elevator platforms 32 and 33 are moved to whatever positions permit the proper amount of light to pass into the eyepiece 10 and the color determination is then determined by the ratio between the readings of the left and right hand scales.

The range of colors which can be read directly in percent is limited by the distance between the lower face of the plunger 7 and the upper face of the window 4 which distance is selected to correspond to a reading of 10.00 on the left hand scales. On the other hand the relative accuracy of the measurement of a quantity is increased by increasing the magnitude of the quantity. In the present case the various parts of the colorimeter have been so proportioned that, with the left hand scales set at 10.00, the right hand scales will read percentage of color concentration over a satisfactory commercial range of readings. For instance, with the instrument scaled as shown in the drawings, color concentrations from 0 to 140 percent can be read directly. It is evident that this choice of range (0–140%) is arbitrary. By suitable and obvious alterations the instrument could be scaled to some other range, as 0 to 200 percent for example.

In the use of measuring instruments it is common practice to select an instrument with a range such that the measurement will fall near the upper end of the scale. Specifically the upper half of the scale is preferred. In a colorimeter it is believed best to so proportion the instrument as to provide a commercial working range, applicable to most solutions, which is approximately one half of the total range. In order to allow for unknowns of greater as well as lesser color concentrations than the standard solutions the scales are adjusted so that 10.00 lies near the center of the upper half of the total range. Thus, if 10.00 be taken as midway of the commercial working range, the upper limit of the scale would be 13⅓ (or, to simplify the scale, 14.00 as shown in the drawings) and the lower theoretical limit of the commercial working range would be 6⅔. As the latter is one half of 13⅓, it follows that the 10.00 position is midway of the commercial working range selected, and the latter is one half of the total range of movement available.

The solid glass plungers 7 and 8 have their upper ends beveled downwardly and rearwardly and also downwardly and outwardly. This causes the light which passes through the cups 5 and 6 and up into said plungers 7 and 8 to be deflected at the upper ends of said plungers inwardly into the bi-prism 9. It is obvious that to obtain these results the plungers, being of unsymmetrical form, must be located in definite relation to the standard 13 of the colorimeter frame. This result is obtained by rigidly connecting the upper end of each plunger by means of cement 66 to an annular collar 67 which is provided with an annular flange 68, the latter being definitely located relatively to the standard 13 of the colorimeter frame by a locking pin 69 which passes through said flange 68 and engages with a suitable hole drilled in a mounting block 70 which is suitably secured to the standard 13 of the colorimeter frame. Each collar is rigidly secured in position by a clamp ring 71 which is threaded into the lower face of said mounting block 70 and forces the flange 68 of the clamping collar 67 firmly against said mounting block.

The bi-prism 9 is mounted in any suitable manner in the mounting block 70 at the upper end of the standard 13 axially within the lower end of the eyepiece tube 72 and deflects the light which it receives from the plungers 7 and 8 up through the usual eyepiece lens 73 and through the aperture 74 of the eyepiece 10. Adjustment of said eyepiece lens 73 relatively to the rest of the optical system, so as to provide for the necessary adjustment for the individual user, is effected in the usual way by raising and lowering the eyepiece 10.

As it is ordinarily desirable to so alter the characteristics of light coming up from the artificial source of illumination, namely, lamp 1, as to have a quality of light which is similar to daylight, a filter 75 is provided just over the aperture 74. By reason of this arrangement only a very small size of filter is necessary because of the smallness of the size of the aperture 74 and, in addition, the filter functions as a means of preventing dust from going down through said aperture 74 into the barrel of the eyepiece 10 and eyepiece tube 72.

It will be noted that this arrangement causes the beams of light from the plungers 7 and 8 to be deflected forwardly, as well as inwardly, relatively to the axes of the plungers 7 and 8 and their companion cups 5 and 6. This permits the operator to look through the eyepiece 10 at a convenient angle without necessitating an excessively angular disposition of the plungers and cups. At the same time said plungers and cups are disposed at an angle to the vertical sufficiently large so that a slight upward or downward movement of the cups will cause any air bubbles which may have formed at the bottom of the plungers to be readily and quickly brushed off. In addition to this the bevel at the upper end of each plunger deflects the light inwardly into the bi-prism 9. In other words both this inward deflection and also the forward deflection of the light are effected by the beveled shape of the upper ends of the solid glass plungers. This is superior to previous constructions inasmuch as the latter are more expensive to manufacture and are more likely to get out of alignment and also cause an unnecessary loss of light because of the superfluous air-to-glass surfaces.

*Figs. 7 and 8*

In these figures is shown a modified means of adjusting the fiducial mark relatively to the fine scale. In this case, the fine scale 76 is engraved or otherwise marked on the annular periphery of the operating knob 77 while the coarse scale 78 is marked on the coarse scale ring 79. Disposed between said operating knob 77 and said coarse scale ring 79 is a fiducial disc 80 having a fiducial mark 81 marked or formed at its upper edge. This fiducial disc 80 is a movably mounted upon the operating shaft 82 and is adapted to be rotated in the one or other direction so as to properly register its fiducial mark 81 with one of the 0 marks of the fine scale 76 when its companion colorimeter cup is in one certain position. This adjustable rotation of the fiducial disc 80 is effected by an adjusting screw 82′ which is threaded into a lug 83 formed in the upper face of the base 12 of the colorimeter and engages with its nose against a depending arm 84 formed integrally or otherwise at the lower end of the fiducial disc 80. Said arm 84 is held in firm contact at all times with said adjusting screw 82′ by means of a tension spring 85 which is connected at its opposite ends to said arm 84 and said upstanding lug 83. When the proper adjustment of the fiducial disc 80 has been effected, the adjusting screw 82′ is locked in position by a suitable lock screw 86 which clamps together the ears 87 at the upper end of the lug 83. The adjustment of the coarse scale ring 79 relatively to the fiducial disc 80 is effected in the manner shown in Fig. 4; i. e., by adjustably rotating the coarse scale ring on its planetary ring and locking it in position by a small set screw, such as the set screw 56 shown in Fig. 4.

The particular constructions shown in the appended drawings only illustrate a few of the possible embodiments of the invention and are merely illustrative thereof and it is to be understood that the invention may be constructed in various manners other than those shown without departing from the invention and that the scope of the invention is only to be limited by the following claims:

Having described our invention we claim:

1. In a device of the character described, a pair of cup members, a pair of plunger members, each of said cup members being in aligned relation with one of said plunger members, said plunger members each being adapted to enter its respective cup member to vary the depth of the contents thereof, one of said cups being adapted to contain a standard and the other of said cups being adapted to contain a test specimen, adjusting means for adjusting the relative position of each of said cup members and its respective plunger member, each of said adjusting means having indicating means, one of said indicating means comprising a unit mark and an index, the other of said indicating means comprising an index and a scale member, said scale member comprising two parts, one of said parts being graduated in integer values and the other of said parts being graduated in fractions of said integer values, the indicating member having the parts graduated in integer values and fractions of said integer values indicating the concentration of the specimen in the cup member associated with the unit mark and index, when the cups and plungers are in such relation with each other that the color intensity of the light transmitted through the standard and test specimen appears equal and the index and unit mark indicating means are in alignment and the adjusting means of the cup and plunger associated with the scale and index are positioned so that the color intensity of the light transmitted through the standard and test specimen appears equal.

2. In a device of the character described, a pair of cup members, a pair of plunger members in aligned relation with said cup members, said plunger members each being adapted to enter its respective cup member to vary the depth of the contents thereof, one of said cups being adapted to contain a standard and the other of said cups being adapted to contain a test specimen, adjusting means for adjusting the relative position of each of said cup members relative to its respective plunger member each of said adjusting means having indicating means, one of said indicating means comprising a unit mark and an index, the other of said indicating means comprising an index and a scale member, said scale member having a part graduated in integer values and a part graduated in fractions of said integer values, the indicating member having the parts graduated in integer values and fractions of said integer values indicating a multiple of .1 of the concentration of the specimen in the cup member containing the test specimen when the cups and plungers are in such relation with each other that the color intensity of the light transmitted through the standard and test specimen appears equal and the index and unit mark indicating means are in alignment and the adjusting means of the cup and plunger associated with the scale and index are positioned so that the color intensity of the light transmitted through the standard and test specimen appears equal.

3. In a device of the character described, a pair of cup members, a pair of plunger members in aligned relation with said cup members, said plunger members each being adapted to enter its respective cup member to vary the depth of the contents thereof, one of said cups being adapted to contain a standard and the other of said cups being adapted to contain a test specimen, adjusting means for adjusting the relative position of each of said cup members and its respective plunger member, each of said adjusting means having indicating means, one of said indicating means comprising a unit mark and an index, the other of said indicating means comprising an index and a scale member, said scale member having a part graduated in integer values and a part graduated in fractions of said integer values, said indicating means comprising an index and scale member indicating a predetermined percentage of the concentration of the specimen in the cup member containing the test specimen when the cups and plungers are in such relation with each other that the color intensity of the light transmitted through the standard and test specimen appears equal and the index and unit mark indicating means are in alignment and the adjusting means of the cup and plunger associated with the scale and index are positioned so that the color intensity of the light transmitted through the standard and test specimen appears equal.

ALVA H. BENNETT.
ROGER S. ESTEY.